(12) United States Patent
Schindler et al.

(10) Patent No.: US 8,543,654 B2
(45) Date of Patent: Sep. 24, 2013

(54) CONTEXTUAL CONVERSATION FRAMEWORK

(75) Inventors: Christopher Schindler, Sammamish, WA (US); Yiu-Ming Leung, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 236 days.

(21) Appl. No.: 12/971,420

(22) Filed: Dec. 17, 2010

(65) Prior Publication Data

US 2012/0158864 A1  Jun. 21, 2012

(51) Int. Cl.
*G06F 15/16* (2006.01)

(52) U.S. Cl.
USPC .......................................... 709/206; 709/204

(58) Field of Classification Search
USPC ........................ 709/204–207; 715/751–759
See application file for complete search history.

(56) References Cited

U.S. PATENT DOCUMENTS

| | | | |
|---|---|---|---|
| 5,565,887 A * | 10/1996 | McCambridge et al. ..... 715/856 |
| 7,207,068 B2 | 4/2007 | Chaudhari et al. |
| 7,467,181 B2 | 12/2008 | McGowan et al. |
| 7,503,007 B2 | 3/2009 | Goodman et al. |
| 8,042,151 B2 * | 10/2011 | Olsen et al. ........................ 726/2 |
| 2003/0070176 A1 * | 4/2003 | Parker et al. .................... 725/105 |
| 2004/0037396 A1 * | 2/2004 | Gray et al. ..................... 379/67.1 |
| 2004/0186721 A1 | 9/2004 | Beynon et al. |
| 2005/0147118 A1 * | 7/2005 | Jonsson ......................... 370/465 |
| 2005/0209868 A1 * | 9/2005 | Wan et al. .......................... 705/1 |
| 2006/0010240 A1 * | 1/2006 | Chuah ............................ 709/228 |
| 2006/0155785 A1 * | 7/2006 | Berry et al. .................... 707/204 |
| 2006/0165040 A1 * | 7/2006 | Rathod et al. .................. 370/335 |
| 2007/0043823 A1 * | 2/2007 | George et al. .................. 709/207 |
| 2007/0230439 A1 * | 10/2007 | Milstein et al. ................ 370/352 |
| 2007/0266096 A1 * | 11/2007 | Daly et al. ...................... 709/204 |
| 2008/0126310 A1 * | 5/2008 | Xu ..................................... 707/3 |
| 2008/0140776 A1 * | 6/2008 | Horvitz .......................... 709/204 |
| 2008/0276250 A1 | 11/2008 | Groetzner et al. |
| 2008/0317232 A1 * | 12/2008 | Couse et al. ............. 379/210.01 |
| 2009/0192970 A1 | 7/2009 | O'Sullivan et al. |
| 2009/0265236 A1 * | 10/2009 | Schultz et al. ................... 705/14 |
| 2010/0111071 A1 | 5/2010 | Khare |
| 2010/0325557 A1 * | 12/2010 | Sibillo .......................... 715/751 |
| 2010/0332977 A1 * | 12/2010 | Nelson et al. ................. 715/273 |
| 2012/0005596 A1 * | 1/2012 | Carlson et al. ................ 715/751 |
| 2012/0011237 A1 * | 1/2012 | Bagwandeen ................ 709/223 |

OTHER PUBLICATIONS

The Authoritative Dictionary of IEEE Standard Terms. 7th ed. 2000.*
Wang, et al., "Context-based Message Expansion for Disentanglement of Interleaved Text Conversations", Retrieved at << http://www.aclweb.org/anthology/N/N09/N09-1023.pdf >>, Proceedings of Human Language Technologies: The Annual Conference of the North American Chapter of the Association for Computational Linguistics, Jun. 2009, pp. 9.
"Context-Sensitive Searches and Functionality for Instant Messaging Applications" U.S. Appl. No. 11/675,787, filed Feb. 16, 2007, pp. 23.

* cited by examiner

*Primary Examiner* — Brendan Higa
(74) *Attorney, Agent, or Firm* — Turk IP Law, LLC

(57) ABSTRACT

A platform and end user interface are provided as part of a contextual communications framework for enabling developers to add context to conversations before they start or as they occur. The context may be consumed through a communication application user interface or through an application associated with a contextual document or file. The exchanged context and any updates to it may be stored following the conversation such that subsequent continuations of the conversation may be provided with the updated context.

20 Claims, 7 Drawing Sheets

CONTEXTUAL CONVERSATION FRAMEWORK

BACKGROUND

Business communications are about completing a task. Significant time may be consumed in conversations setting up the context. Questions such as "What is the conversation about?", "What tools do I need open?", "What is my role?", "What is my location?", "What information might I need to answer a question?" define the context of a conversation. The closer a task's context is to the communication experience, the greater end-user productivity may be.

Modern communication systems such as unified communications (UC) systems combine various modes of communication (e.g. instant messaging, voice calls, video communications, etc.) and provide ancillary services like presence, recording, interactive contact lists, etc. Thus, single or multimodal conversations are ever easier to establish. However, with little or no context, even these contemporary forms of communication fail to save time and effort to users, who may have to manually retrieve, transmit, share, etc. documents, files, and other contextual items in addition to spending time to understand the context as a conversation is initiated. Furthermore, when conversations continue, even more time and energy may be lost in trying to capture the latest state of the context (i.e., any changes since the last conversation).

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a contextual communications framework providing a platform and end user interface that enables developers to add context to conversations before they start or as they occur. According to some embodiments, the context may be consumed through a communication application user interface or through an application associated with a contextual document or file. The exchanged context and any updates to it may be stored following the conversation such that subsequent continuations of the conversation may be provided with the updated context.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
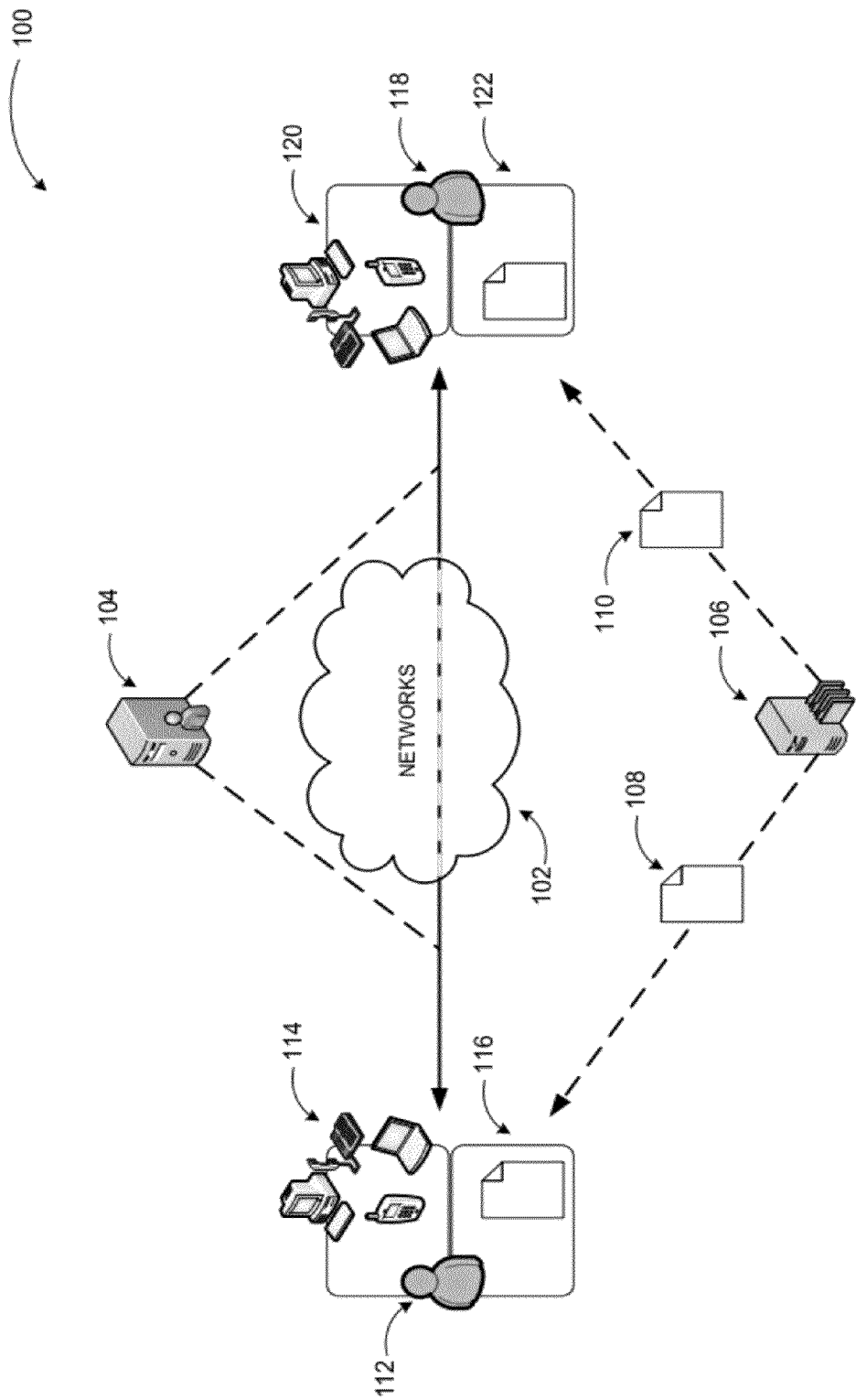
FIG. 1 is a conceptual diagram illustrating an example networked communication and document use environment, where a contextual conversation framework may be implemented.

As briefly described above, a contextual communications framework may enable developers to add context to conversations before they start or as they occur. The context may be consumed through a communication application user interface or through an application associated with a contextual document or file. The exchanged context and any updates to it may be stored following the conversation such that subsequent continuations of the conversation may be provided with the updated context. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing enhanced communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a conceptual diagram illustrating an example networked communication and document use environment, where a contextual conversation framework may be implemented. The backbone of a framework according to embodiments is an enhanced communication system that can facilitate multimodal communications between users while interacting with other applications such as context applications.

A unified communication (UC) system is an example of enhanced communication systems with a wide range of capabilities and services that can be provided to subscribers. A unified communication system is a real-time communications system facilitating email exchange, instant messaging, presence, audio-video conferencing, web conferencing, and similar functionalities.

In a UC system such as the one shown in diagram 100, users may communicate via a variety of end devices 114 and 120, which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through Private Branch Exchange (PBX) to a Public Switched Telephone Network (PSTN) or cellular communications through a cellular network.

The communication system shown in diagram 100 may include a number of servers performing different tasks. For example, communication server 104 may manage conversations between users (112, 118) over one or more networks 102. The system may also interact with one or more other servers providing different functionality such as document sharing, collaborative editing, calendaring, scheduling, audio or video data sharing, and similar ones. The interaction with these additional services may be through generic clients such as browsers executed at client machines of users 112, 118 or through rich client applications 116, 122. For example, server 106 may provide a collaborative document sharing service, which may enable users 112 and 118 to access documents 108 and 110, respectively. Such documents and other forms of data (files, audio/video data, etc.) constitute context. The ancillary services described above are referred to as context services or applications herein.

In a system according to embodiments, a context application may be activated through a communication application user interface or a context application may include an embedded user interface for activating the communication application. In response to activation of the communication application from within the context application or other means of detecting context associated with a conversation (e.g. selection of context from a menu, a list view, etc.), the conversation may be initiated providing the initiating user and any addressed users the context. Examples of determining the context and providing it at the establishment of the conversation are discussed in more detail below.

While the example system in FIG. 1 has been described with specific components such as communication servers, context servers, and similar devices, embodiments are not limited to these components or system configurations and can be implemented with other system configuration employing fewer or additional components. A contextual conversation framework may be distributed among the components of the system depending on component capabilities and system configuration. Furthermore, embodiments are not limited to unified communication systems. The approaches discussed here may be applied to any multimodal communication system using the principles described herein.

Figure 2:
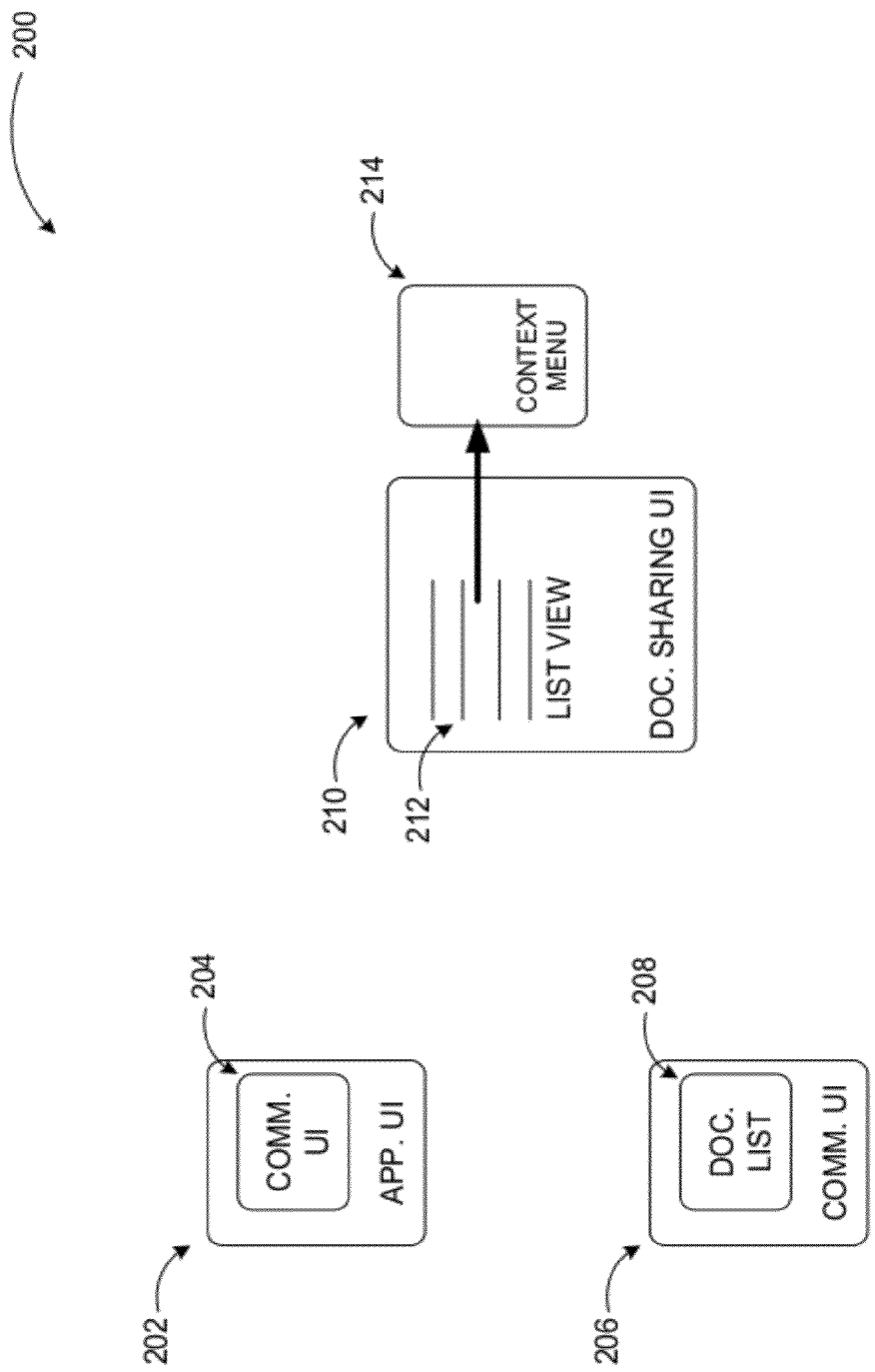
FIG. 2 illustrates examples for initiation of a context supported conversation according to some embodiments.

FIG. 2 illustrates examples for initiation of a context supported conversation according to some embodiments. Enhanced communications, especially business communications, are centralized around completing a task. Providing a framework for the exchange and use of rich context enables third party developers and end users to be more productive through task efficiency and improved user experiences. A framework according to embodiments enables setting up and description of context for a conversation, enables the interpretation and display of the context, passes additional context between conversation participants, and enables the storage of context-rich communications for future use.

Setting up and compiling context (or metadata) enables the application that is starting the conversation to describe the context, in which the conversation is being started. A contextual conversation framework may also provide a package for building and/or interpreting context when context is received by an end point. The package may fulfill two functions: (1) define the user experience that displays the context and (2) define steps needed to build up a context around that communication. The framework may enable real time exchanges of context for all conversation participants. Moreover, a shared context may be provided for all participants to publish and/or subscribe to. A private context may be provided with restricted access. Applications, including those not directly part of the conversation, may be enabled to publish and subscribe to a conversation context.

A contextual framework may employ a context definition, which is a definition file that describes what application is setting the application, and the application-specific context data. The framework may also employ a context trust model, which ranges from a simple version (e.g., requiring the user to accept a URL) to a more seamless version (e.g., where applications handling context are already verified and do not require user intervention). Application trust may come from registering an application using the package registration mechanism. Package registration may register an application, its associated behavior, and supporting URLs/paths used in a plug-in model for each client machine.

An application interoperability model may define a structure for a business application to interact with the contextually-enhanced communication system and conversation user interface, and provide interfaces for contextual applications to get communication data from the communication client. The framework may also define the end user experience of how they receive and interact with contextual information through presentation of the context in conversation user interface. Conversation placement defines the value proposition for context, which includes the notion that context switching is a costly effort and that some applications are appropriately the "center of gravity" for a user and communication may be required to be in the "context" of that application. This placement element may support the location and parent ownership of the conversation user interface.

Diagram 200 illustrates three example configurations of how a conversation may be initiated in conjunction with providing context. According to a first scenario, a context application user interface 202 may provide various controls and views associated with context data. For example, context application user interface 202 may be a word processing application user interface, a spreadsheet user interface, an audio/video processing application user interface, and comparable ones. In an implementation of the present disclosure, a communication application user interface 204 may be embedded into the context application user interface 202. The communication application user interface 204 may include full or partial capabilities associated with initiating and facilitating communications. A conversation according to embodiments may include one or more communication sessions employing one or more modalities. When a user activates communication from the communication application user interface 204 when viewing or otherwise handling a contextual document/data, that document/data may be used as context for that conversation.

According to another scenario, a communication application user interface 206 may include a portion 208, which displays available context data/documents. For example, a list of documents the user recently worked on may be displayed such that the initiating user can select one or more documents from the list to be used as context.

According to a further scenario, a collaboration application user interface 210 may provide a list view 212 of available documents/data. Upon selecting one of the items on the list view 212, a user may be presented with a context menu 214 (e.g. a drop-down menu, a pop-up menu, etc.) that includes as one of the action items activation of a communication session. The selected item in the list view 212 may then be used as context for the initiated communication session.

Figure 3:
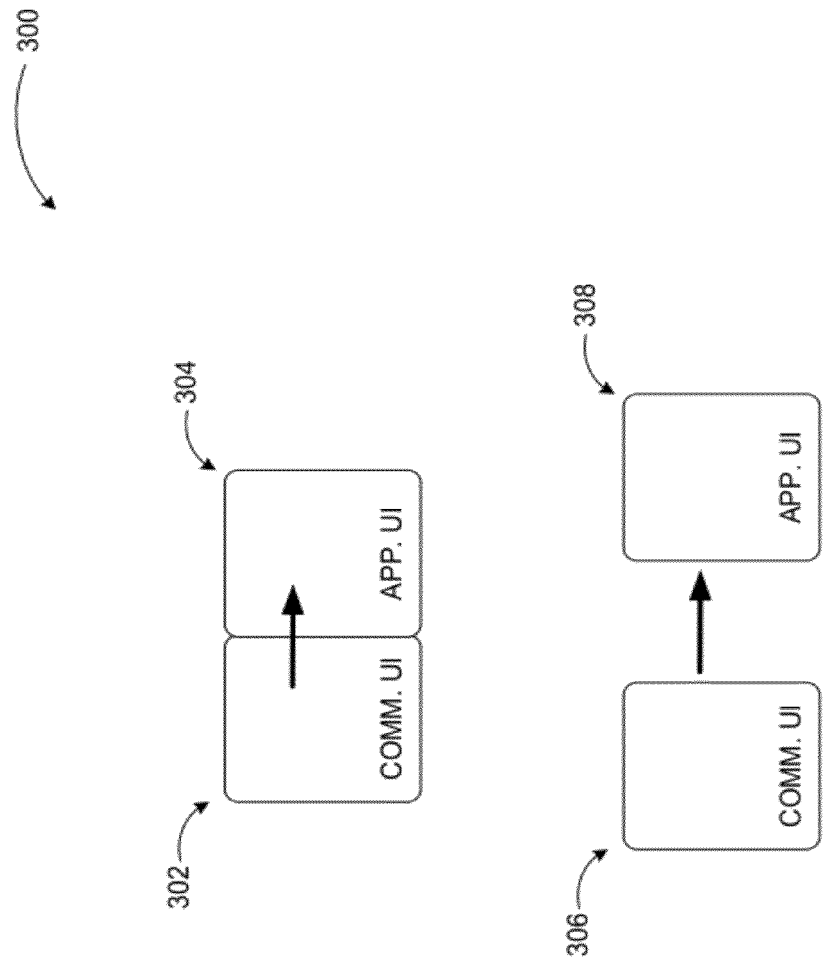
FIG. 3 illustrates example user interface configurations for context supported conversations according to other embodiments.

FIG. 3 illustrates example user interface configurations for context supported conversations according to other embodiments. Context of a conversation may involve exchange of data associated with the contextual items (e.g., documents, files, images) prior to and during the conversation. The exchanged data may be presented to the participating users in a variety of ways.

According to one example implementation, the communication application 302 facilitating the conversation may activate an embedded or attached user interface 304 for one or more context applications to present the context data. The user interfaces may include full or partial functionality. For example, the context data may include a word processing document and a spreadsheet. Upon establishing the conversation, a word processing viewer and a spreadsheet viewer may be activated within or next to the communication application user interface such that participating users can view and/or edit the contextual documents.

According to another scenario, communication application 306 may activate a rich client application with its user interface 308 on each user's desktop such that the users can view and/or edit the contextual documents. Thus, along with information associated with the contextual data information identifying a client application to process the contextual data may be passed to the other users' communication applications to enable them to activate the relevant client applications.

Figure 4:
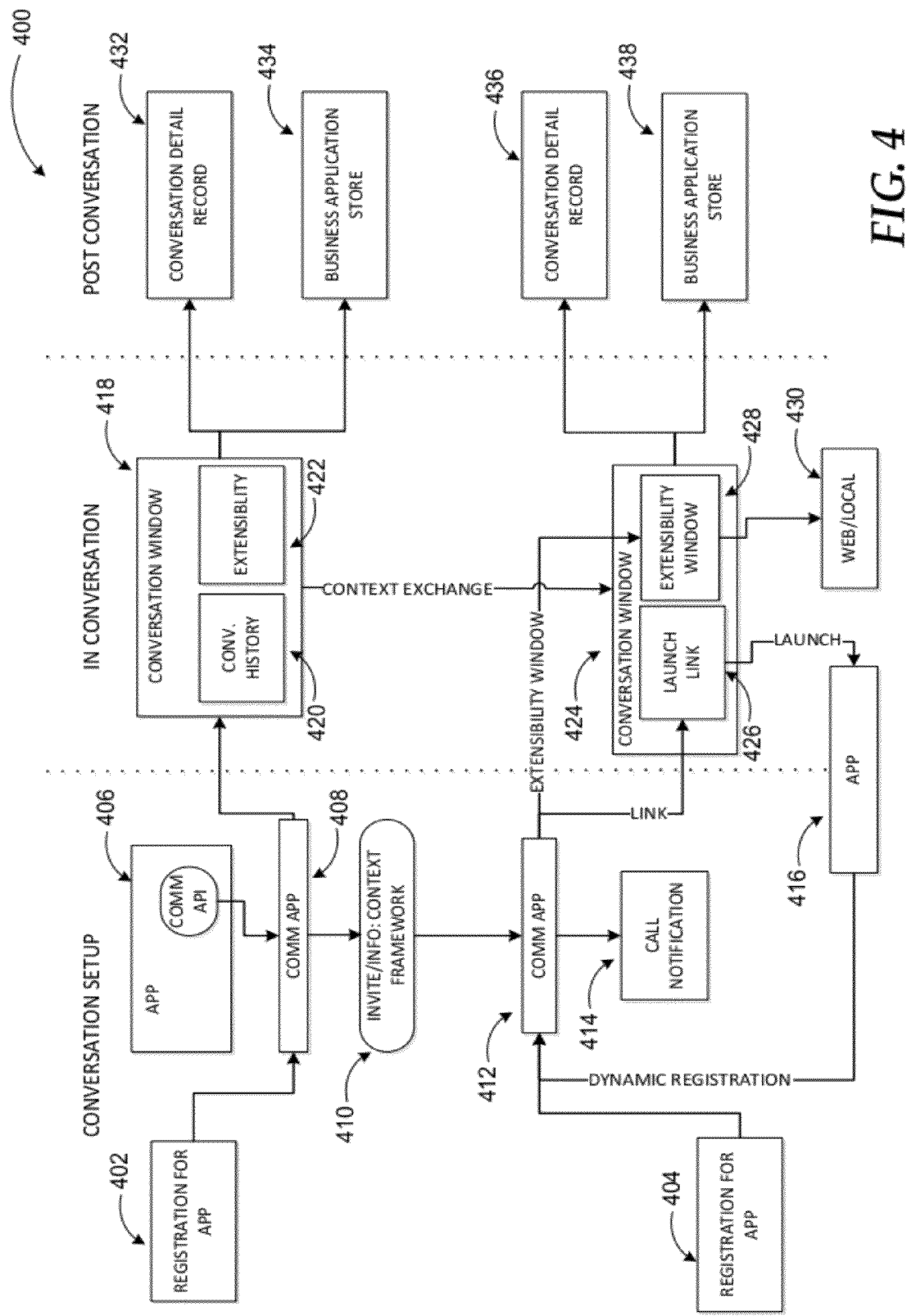
FIG. 4 illustrates a flow among major components of a contextual conversation framework according to embodiments before, during, and after a conversation occurs.

FIG. 4 illustrates a flow among major components of a contextual conversation framework according to embodiments before, during, and after a conversation occurs. Diagram 400 covers three phases: conversation setup, in conversation, and post conversation. The framework illustrated in diagram 400 uses a business application environment as example, but embodiments are not limited to business applications as context application. Any application may be used to determine and provide context.

In the conversation setup phase, application 406 (e.g., a business application) may be registered (402) with a communication application 408. Application 406 may include a communication application programming interface (API). The communication application 408 may send an invitation 410 to initiate conversation along with information on the context framework to communication application 412 of a receiving user. The information on the context framework may include context data, application identifier(s), user identifiers, etc. The information may be sent, according to some embodiments as an extensible markup language file (XML file). Communication application 412 of the receiving user may issue a call notification 414 to the user. At the same time, corresponding application 416 of the receiving user may be registered (404) manually or dynamically in response to the received context XML, for example.

In the in conversation phase, a conversation window 418 of the initiating user may display conversation history 420 and extensibility window 422. The extensibility window 422 may include a user interface for presenting contextual data (e.g., the embedded user interface discussed in conjunction with FIG. 3). The communication application 412 of the receiving user may control an extensibility window 428 in the conversation window 424 of the receiving user and provide a link to a launch link 426. The launch link 426 may enable activation of receiving user's application 416 manually by the user. Extensibility window 428 may provide links to web or local connections 430. Context exchange between the conversation windows may enable both users to share the contextual data.

In the post conversation phase, conversation detail records 432 and 436 may be created on both sides, the initiating user and the receiving user. Updated context data may be stored in business application stores 434 and 438 of the initiating and receiving users such that future sessions of the conversation can be established with updated context data.

In a conversation setup phase before the conversation is established, the sender's context may be captured, such as initiating application, application objects, identifiers, and sets up the receiver's context using features such as application launch, application coordination, record retrieval and use of the extensibility window 422. During an in conversation phase, a live context channel may be enabled between participants to pass real-time data between applications 406 and 416.

Launch link 426 may be presented to the end user if it is provided in the context file (e.g., a context XML) and is part of a validated application. Upon activation launch link may call a shell link provided in package registration if target application is not run-time registered using the contextual framework, or send an event to the registered application if target is registered using run-time registration. In both cases, the link may be provided to the end user whose activation initiates one of the above actions.

According to an example scenario, an end user may start a voice call from a retail site about a particular product. The launched conversation included context data that may be passed to the communication system. The call may be routed to an agent by starting a conference, then adding the agent and the end user to the conference. The agent may receive the context and the contextual package may start an extensibility window application.

According to another scenario, a production supervisor may start a conversation, including context, from his/her supply chain management (SCM) application with a sales manager. When the sales manager accepts the invite, the conversation may open and, using the context, both users may see the SCM application in the extensibility window. During the conversation, one of them may select a customer relationship management extensibility application from his/her conversation menu, which may activate in a new tab. Looking through the CRM application, one of the users may select an "Add to conversation" button from a selected item. The button, provided by the extensibility application, may send that application's context to the other user. The other user, seeing the contextual invitation, may accept the invite, and the CRM application may automatically activate. After the conversation, each of the communication client applications may save the updated context.

Figure 5:
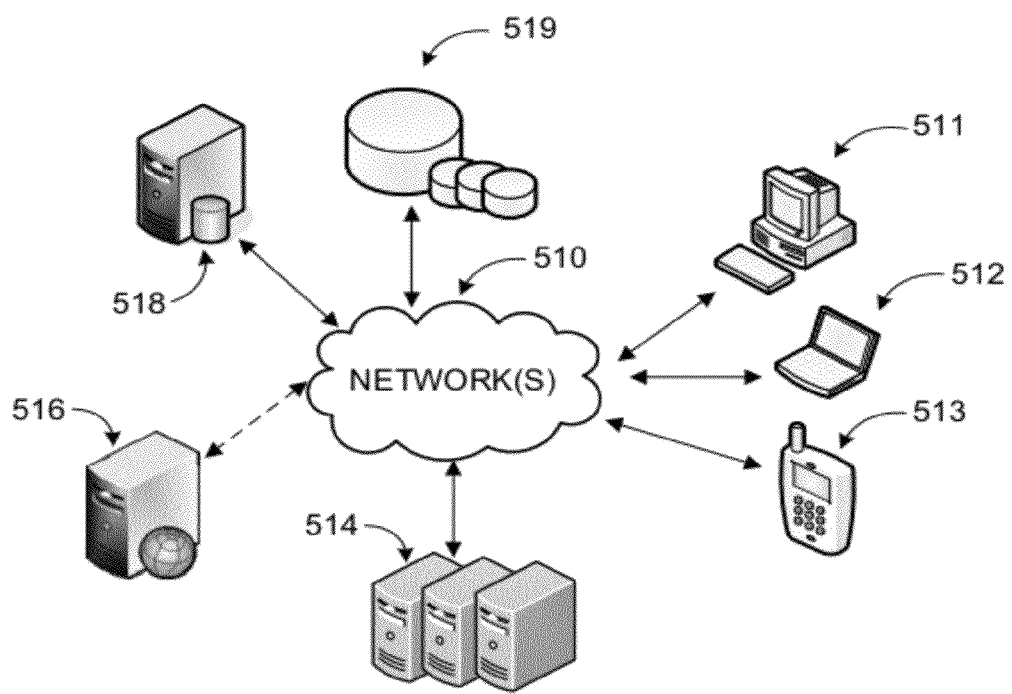
FIG. 5 is a networked environment, where a system according to embodiments may be implemented.

FIG. 5 is an example networked environment, where embodiments may be implemented. A contextual conversation framework may be implemented via software executed over one or more servers 514 or a single server (e.g. web server) 516 such as a hosted service. The platform may communicate with client applications on individual computing devices such as a smart phone 513, a laptop computer 512, or desktop computer 511 ('client devices') through network(s) 510 providing communication and other services.

As discussed above, context applications may include a number of applications/services enabling users to view/edit documents, data files, audio/video files, and similar ones. By integrating context determination with communication services, a framework according to embodiments may determine a context of a conversation prior to its establishment and provide it as the conversation is initiated through a communication application user interface or an embedded user interface within a context application. Changes to the context (additions, modifications, deletions, etc.) may be recorded and the updated context stored for future sessions of the conversation.

Client devices 511-513 may enable access to communication applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide contextual conversation framework. Furthermore, the networked environments discussed in FIG. 5 are for illustration purposes only. Embodiments are not limited to the example applications, modules, or processes.

Figure 6:
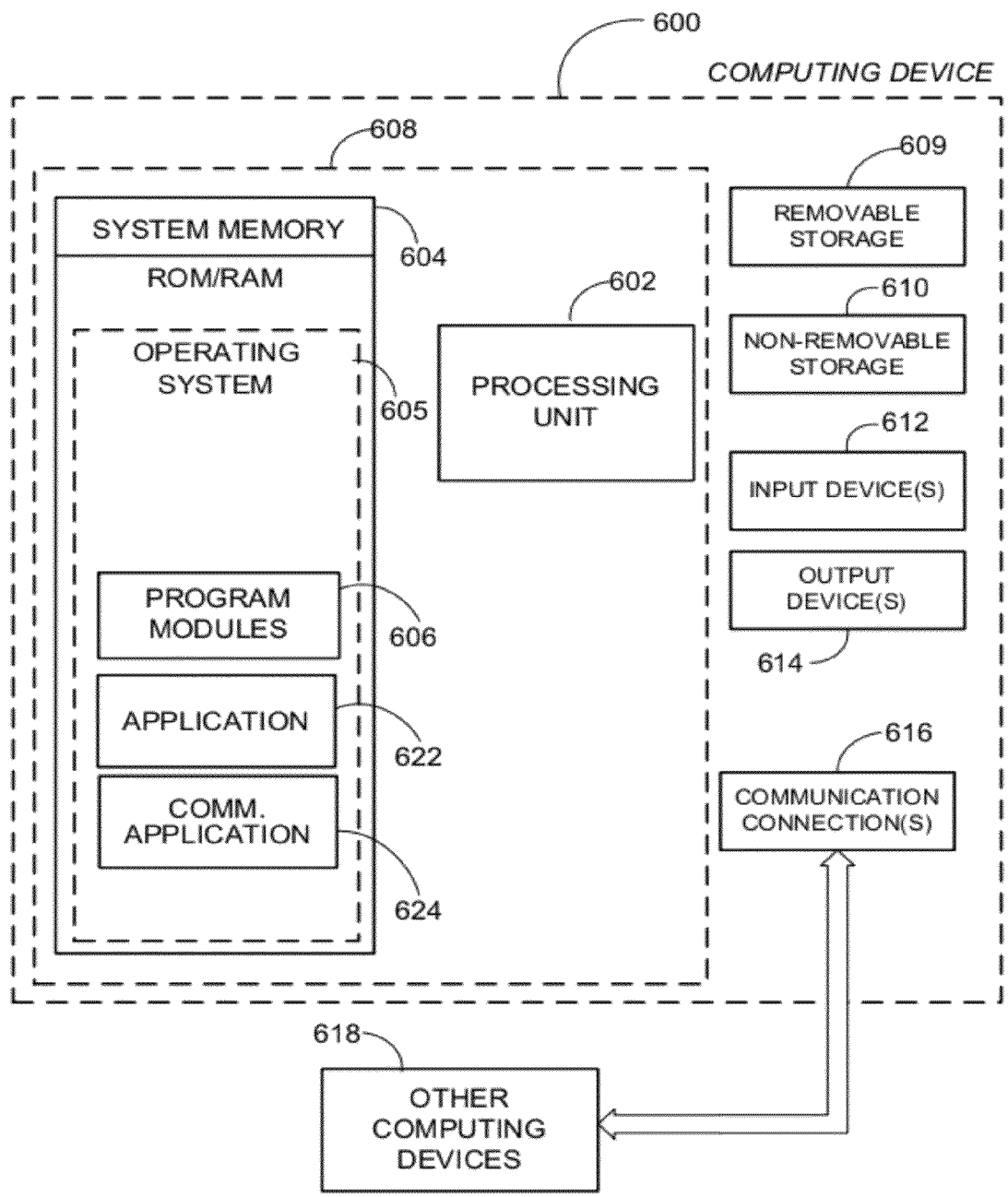
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server that provide a contextual conversation framework and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, context application 622, and communication application 624.

Context application 622 may be any application that provides a wide variety of services such as editing documents, analysis, reporting, calendaring, scheduling, viewing, and so on. Some examples of context applications may include word processing, presentation, spreadsheet, drawing, calendar, data analysis, and browsing applications. Context application 622 may generate or consume data in form of files or documents, which may be used to determine a context for a conversation facilitated by communication application 624. The conversation may be facilitated in one or more modes such as audio, video, data exchange, text messaging, email, application sharing, and so on. Through integration of user interfaces and data interfaces of context application 622 and communication application 624 in various configurations, the context of the conversation may be provided to initiating/participating users as the conversation is established and also stored for future sessions of the conversation. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, and includes any information delivery media. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
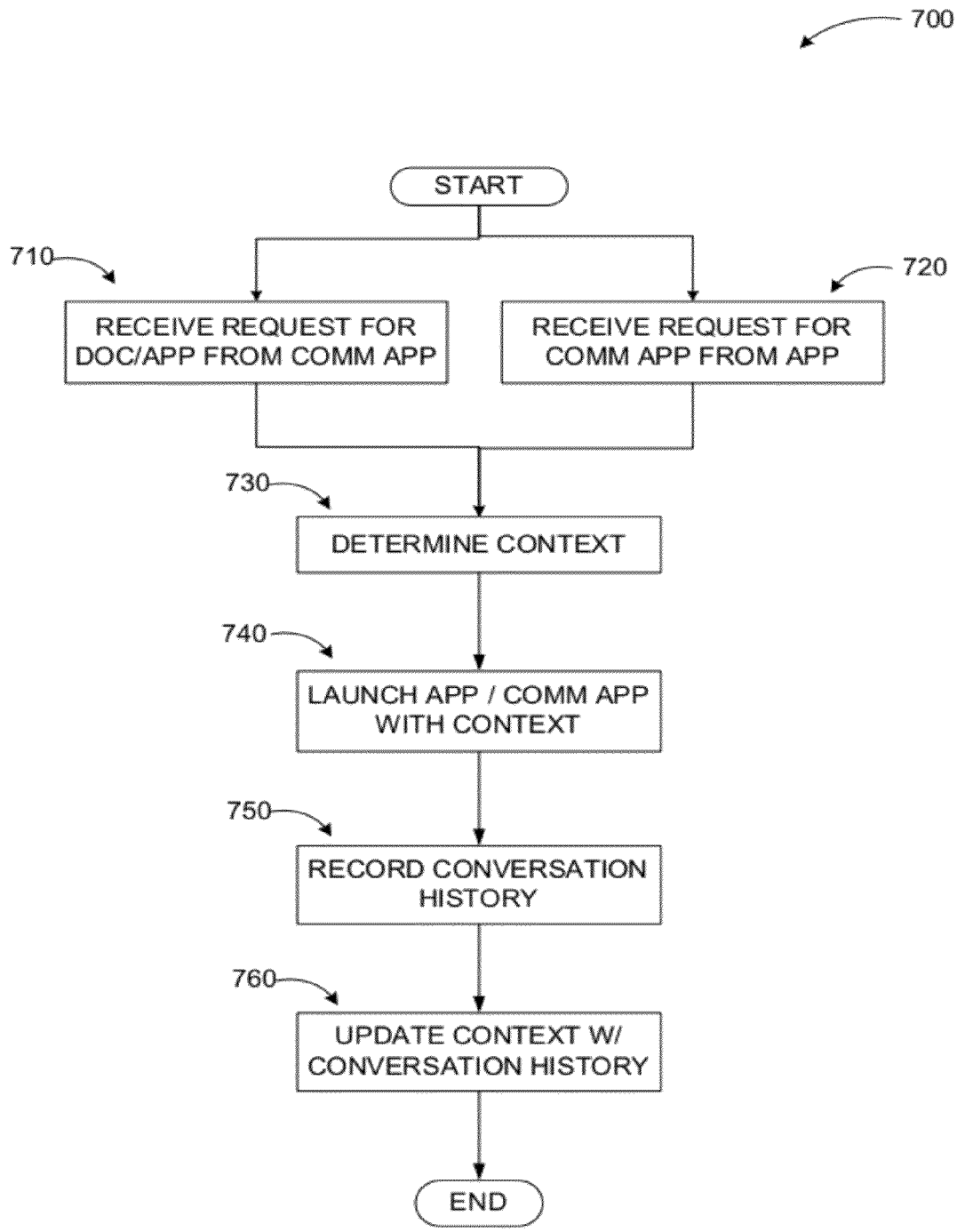
FIG. 7 illustrates a logic flow diagram for a process of providing contextual support for conversations according to some embodiments.

FIG. 7 illustrates a logic flow diagram for a process of providing contextual support to conversations according to embodiments. Process 700 may be implemented by a server in an enhanced communication system providing multimodal communication services to clients.

Process 700 may begin at operation 710 or 720, where a request for a context application or context itself (e.g. a document) may be received from a user interface of a communication application or a request for the communication application may be received from a user interface of the context application, respectively. At operation 730, the context of the conversation may be determined based on an origination of the request, a conversation history, user attributes, or other factors as discussed previously.

At operation 740, the context application and/or the communication application may be launched depending on where the request originated (at operation 710 or 720) enabling the initiating user and any responding users to participate in the conversation taking advantage of the contextual information. At operation 750, the conversation history may be recorded and any changes to the context updated at operation 760 such that the conversation history and the up-to-date context is available for future sessions of the conversation.

The operations included in process 700 are for illustration purposes. A contextual conversation framework according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for providing a contextual conversation framework, the method comprising:
   receiving a request to initiate a conversation through a communication application user interface;
   compiling metadata associated with the conversation, wherein the metadata includes one or more of: an origination of the request, a conversation history, and a plurality of user attributes;
   determining an initiating user's context based on the compiled metadata associated with the conversation;
   providing the initiating user's context to a receiving user as a conversation context;
   defining a context definition including a definition file describing application-specific context data;
   defining a receiving user's context based on the initiating user's context;
   defining a plurality of steps for building a conversation context;
   transmitting the receiving user's context along with a conversation invite, the plurality of steps for building the conversation context, and the context definition as a package;
   establishing a context channel between the initiating user and the receiving user activated at a context application at the receiving user's client such that real time data, including one of: contextual data and a document, is exchanged for sharing a conversation context while the conversation is being facilitated;
   verifying the conversation context at a context trust model for establishing application trust of one or more applications associated with the initiating user and the receiving user, wherein the trust is determined from registration of an application, associated behavior and supporting URLs and paths used;
   upon conclusion of the conversation updating the conversation context; and
   enabling one or more applications to store a conversation history, publish and subscribe to the updated conversation context.

2. The method of claim 1, wherein the communication application user interface is embedded into a context application user interface.

3. The method of claim 1, wherein the communication application user interface includes an embedded user interface for the context application.

4. The method of claim 1, wherein the communication application user interface is a context menu activated within a list view of a collaboration application user interface in response to selection of an item in the list view.

5. The method of claim 1, further comprising:
   activating one of an embedded and an attached context application user interface in conjunction with a communication application user interface of the receiving user to process contextual data.

6. The method of claim 5, wherein the embedded and the attached context application user interfaces include partial control capability.

7. The method of claim 1, further comprising:
   activating a rich client application with full control capability for the receiving user to process contextual data.

8. The method of claim 1, further comprising:
   storing conversation history for providing context to subsequent conversation sessions along with the updated conversation context.

9. The method of claim 1, further comprising:
   storing the updated conversation context in a context application data store such that a subsequent conversation session is initiated using the updated conversation context.

10. The method of claim 1, wherein the context application includes one of:
    a word processing application, a spreadsheet application, a presentation application, a calendar application, an analysis application, a scheduling application, a drawing application, an audio processing application, a business application, and a video processing application.

11. The method of claim 1, wherein the conversation is facilitated employing one or more modalities that include at least one from a set of: audio, video, data sharing, application sharing, whiteboarding, text messaging, email exchange, and online conferencing.

12. A server in a communication system for managing a contextual conversation framework, the server comprising:
a memory storing instructions;
a processor coupled to the memory, the processor executing at least one communication application and at least one context application in conjunction with the instructions stored in the memory, wherein the communication application is configured to:
capture an initiating user's context in response to a request to initiate a conversation;
define a receiving user's context based on the initiating user's context;
define a plurality of steps for building a conversation context;
transmit the receiving user's context along with a conversation invite and the plurality of steps for building the conversation context as a package; and
establish a context channel between the initiating user and the receiving user while the conversation is being facilitated such that real time data is exchanged for sharing the conversation context, wherein the conversation context is verified at a context trust model for establishing application trust of one or more applications associated with the initiating user and the receiving user.

13. The server of claim 12, wherein the initiating user's context includes at least one from a set of: an initiating application, at least one application object, a user identifier, and a data location identifier.

14. The server of claim 12, wherein the receiving user's context includes at least one from a set of: application launch information, application coordination information, record retrieval information, and extensibility information.

15. The server of claim 12, wherein the receiving user's context is transmitted as extensible markup language (XML) data in the conversation invite.

16. The server of claim 12, wherein the conversation context includes a shared context accessible by all participants of the conversation and a private context accessible by permitted participants.

17. The server of claim 12, wherein the communication application is further configured to enable activation of a context application on receiving user's computing device through one of an automatic activation and a manual activation employing a launch link included in the receiving user's context.

18. A computer-readable memory device with instructions stored thereon for providing a contextual conversation framework, the instructions comprising:
capturing an initiating user's context in response to a request to initiate a conversation wherein the request is received through one of: a communication application user interface embedded into a context application user interface, a communication application user interface that includes an embedded user interface for the context application, and a context menu activated within a list view of a collaboration application user interface in response to selection of an item in the list view;
defining a context definition including a definition file describing application-specific context data;
defining a receiving user's context based on the initiating user's context;
defining a plurality of steps for building a conversation context;
transmitting the receiving user's context along with a conversation invite, the plurality of steps for building the conversation context, and the context definition as a package;
establishing a context channel between the initiating user and the receiving user while the conversation is being facilitated such that real time data is exchanged for sharing a conversation context;
verifying the conversation context at a context trust model for establishing application trust of one or more applications associated with the initiating user and the receiving user, wherein the trust is determined from registration of an application, associated behavior and supporting URLs and paths used;
upon conclusion of the conversation updating the conversation context; and
storing a conversation history and the updated conversation context.

19. The computer-readable memory device of claim 18, wherein the instructions comprise:
registering at least one from a set of: the context application, context application behavior, and supporting identifiers for each client device participating in the conversation.

20. The computer-readable memory device of claim 18, wherein the instructions comprise:
enabling users to activate a plurality of context applications during the same conversation and a plurality of conversations from one context application.

* * * * *